(12) United States Patent
Kogel et al.

(10) Patent No.: US 7,942,230 B2
(45) Date of Patent: May 17, 2011

(54) HYDRAULIC POWER STEERING SYSTEM

(75) Inventors: Walter Kogel, Abtsgmuend (DE);
Michael Haegele, Aalen (DE); Manfred Heintschel, Schwaebisch (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 614 days.

(21) Appl. No.: 10/590,168

(22) PCT Filed: Feb. 10, 2005

(86) PCT No.: PCT/EP2005/050592
§ 371 (c)(1),
(2), (4) Date: Jul. 10, 2008

(87) PCT Pub. No.: WO2005/080178
PCT Pub. Date: Sep. 1, 2005

(65) Prior Publication Data
US 2008/0257634 A1 Oct. 23, 2008

(30) Foreign Application Priority Data
Feb. 18, 2004 (DE) .......... 10 2004 007 833

(51) Int. Cl.
*B62D 5/00* (2006.01)

(52) U.S. Cl. ........ 180/405; 180/417; 180/427; 180/407; 180/403; 180/428; 180/444; 180/446; 180/406

(58) Field of Classification Search .......... 180/417, 180/427, 407, 403, 428, 405, 406, 444, 446
See application file for complete search history.

(56) References Cited

U.S. PATENT DOCUMENTS

| 3,944,015 A | * | 3/1976 | Bishop | 180/428 |
| 4,016,949 A | * | 4/1977 | Plate et al. | 180/437 |
| 4,492,283 A | * | 1/1985 | Bertin | 180/428 |
| 4,880,074 A | * | 11/1989 | Matsumoto | 180/444 |
| 5,062,494 A | * | 11/1991 | Okamoto et al. | 180/403 |

(Continued)

FOREIGN PATENT DOCUMENTS

DE 41 30 989 3/1992

(Continued)

OTHER PUBLICATIONS

International Search Report, PCT International Application No. PCT/EP2005/050592, dated Apr. 11, 2005.

(Continued)

*Primary Examiner* — Paul N Dickson
*Assistant Examiner* — Marlon A Arce
(74) *Attorney, Agent, or Firm* — Kenyon & Kenyon LLP

(57) ABSTRACT

A hydraulic power steering system for a vehicle, e.g., an electrohydraulic power steering system for a motor vehicle, includes a servo valve, the relative movement of whose control parts actuates a piston rod of a servo cylinder and changes at least one steering angle of a wheel which is operatively connected to the piston rod, and additionally has an electric servo motor which drives a rack with the servo cylinder for adjusting the steering angle of the wheel in the same direction. In order to provide an electrohydraulic power steering system which is as compactly arranged as possible in the region of its actuator and may be used flexibly for different classes of vehicle, the action of the rack and the piston rod of the servo cylinder is combined, in a parallel arrangement with one another, on an addition member for jointly adjusting the steering angle of the wheel.

10 Claims, 2 Drawing Sheets

U.S. PATENT DOCUMENTS

| | | | |
|---|---|---|---|
| 5,845,736 A | 12/1998 | Bohner et al. | |
| 5,893,427 A * | 4/1999 | Bohner et al. | 180/403 |
| 6,279,675 B1 * | 8/2001 | Bohner et al. | 180/403 |
| 6,367,575 B1 * | 4/2002 | Bohner et al. | 180/403 |
| 6,612,393 B2 * | 9/2003 | Bohner et al. | 180/405 |
| 6,814,177 B2 * | 11/2004 | Bohner et al. | 180/402 |
| 7,210,553 B2 * | 5/2007 | Williams et al. | 180/402 |

FOREIGN PATENT DOCUMENTS

| | | |
|---|---|---|
| DE | 195 41 749 | 5/1997 |
| DE | 101 59 704 | 8/2002 |
| EP | 0 708 011 | 4/1996 |
| EP | 0 931 714 | 7/1999 |
| EP | 1 375 303 | 1/2004 |
| GB | 2 328 191 | 2/1999 |

OTHER PUBLICATIONS

International Preliminary Examination Report, PCT International Application No. PCT/EP2005/050592, dated May 30, 2006 (English-language translation provided).

* cited by examiner

HYDRAULIC POWER STEERING SYSTEM

FIELD OF THE INVENTION

The present invention relates to a hydraulic power steering system for a vehicle, e.g., an electrohydraulic power steering system for a motor vehicle.

BACKGROUND INFORMATION

Hydraulic or electrohydraulic power steering systems for motor vehicles having a servo valve, which is arranged as a rotary slide arrangement and whose control parts—rotary slide sleeve and rotary slide—which are rotatable relative to one another are drive-coupled to one another by a torsion element which sets the control parts in a normal position relative to one another, and having a steering gear which is arranged, for the purpose of transmitting drive, between one of the control parts and steered vehicle wheels and is drive-connected directly or indirectly to a hydraulic servo cylinder which is controlled by the servo valve, are conventional.

A piston rod of the servo cylinder is connected to one or more steerable wheels of the vehicle in a conventional manner via tie rods and steering levers. A toothed rack, which meshes with a pinion of an electric servo motor or a pinion of a mechanical steering shaft connection to a steering handle, is connected in series with the piston rod of the servo cylinder (cf. German Published Patent Application No. 195 41 749 or European Published Patent Application No. 0 708 011).

The series connection of the piston rod and the toothed rack results in a large installation length of an actuator for an electrohydraulic power steering system. As a result, only relatively short tie rods are possible, which lead to unfavorable kinematics of an axle, to large steering inclination angles and sweep angles of the tie rods and to high loading, in particular in commercial motor vehicles, of an electrohydraulic power steering system and its actuator. In addition, electrohydraulic power steering systems of this type are designed, in terms of their steering power, for the respective vehicle in which they are used, and are somewhat inflexible in use.

SUMMARY

Example embodiments of the present invention may provide an electrohydraulic power steering system which is as compactly arranged as possible in the region of its actuator and is suitable for different classes of vehicle.

An electrohydraulic power steering system, which is suitable, e.g., for a commercial motor vehicle, and whose actuator is of short arrangement and may be modularly adapted to different power or weight classes of vehicles, is provided in that the piston rod of the servo cylinder and the rack or toothed rack which is axially displaced by the electric servo motor are arranged parallel to one another, and the rack or toothed rack and the piston rod act on an addition member which is operatively connected to the steerable wheel. The rack of the electric servo motor and the piston rod act on the addition member simultaneously and in the same direction.

The rack and the piston rod may be articulatedly connected to the addition member. The rack or toothed rack may however be fixedly connected to the addition member. The piston rod may be fixedly connected to the addition member, as a result of which the rack, driven by the electric servo motor, and the piston rod perform an axial movement and the addition member, which is arranged as a yoke, is linearly displaced.

Different arrangements of the electric servo motor with the rack, of the servo valve, of the servo cylinder and of their operative connection to one another may also be provided. In an example embodiment, the electric servo motor thus acts on a control part, e.g., a rotary slide, of the servo valve via a step-down gearing. The control part is rotatably operatively connected to a drive output member, such as a gearwheel which meshes with a recirculating ball nut or a pinion which meshes with a toothed rack. When it rotates, the recirculating ball nut causes, in a conventional manner, an axial displacement of the rack which is arranged as a spindle and acts on the addition member.

It may be provided for the control part of the servo valve to be rotated not by the electric servo motor, but rather mechanically by a steering shaft with a steering handle, in order to actuate the servo cylinder.

Example embodiments of the present invention are described in more 4 detail below with reference to the appended Figures.

DETAILED DESCRIPTION

Figure 1:
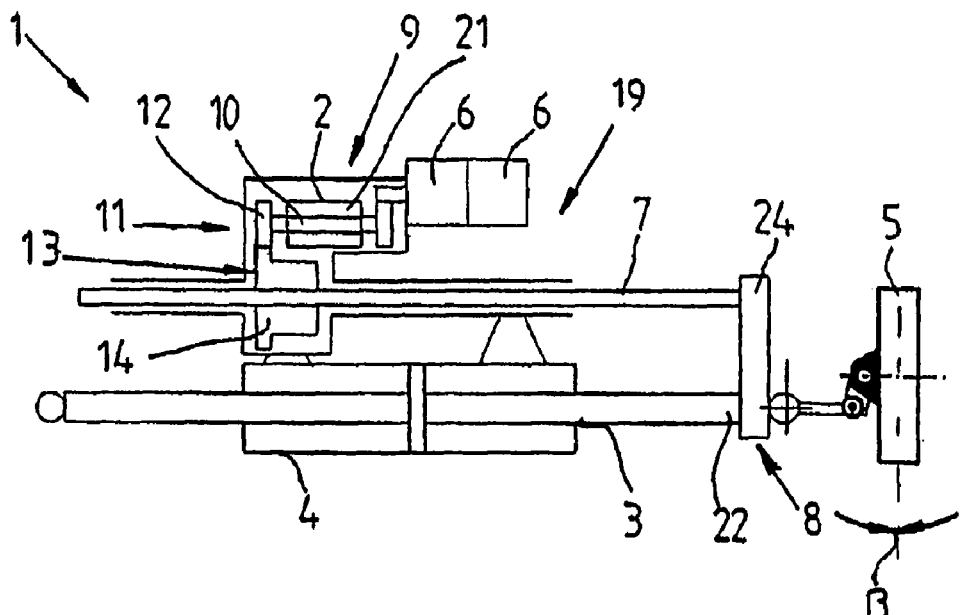
FIG. 1 is a schematic longitudinal cross-sectional view of an actuator of an electrohydraulic power steering system.

FIG. 1 is a schematic longitudinal cross-sectional view of a linear wheel actuator 19 of a hydraulic power steering system 1 with electromotive assistance of the actuating power of a servo cylinder 4. Two series-connected electric servo motors 6 drive via a gearing 9 a control part 10 of a servo valve 2, the control part being arranged as a rotary slide and being mounted in a coaxial rotary slide sleeve 21. The servo valve 2 is connected to a pressure medium container and a hydraulic pump, wherein the pressure medium container is connected, e.g., in a conventional manner, to a low-pressure connection, and the hydraulic pump is connected to a high-pressure connection. A first working space 23 and a second working space 23' of the servo cylinder 4 are fluidically connected to connections of the servo valve 2, and are in each case alternately pressurized with pressure medium for the purpose of displacing a dual-acting piston/piston-rod arrangement in the servo cylinder 4. The servo valve 2 has an open center, that is to say all the connections communicate with one another when the control part 10 and the rotary slide sleeve 21 assume a central position relative to one another. The control part 10 and the rotary slide sleeve 21 are connected to one another by a torsion bar which is arranged in an axial bore of the parts and attempts to keep the control part 10 and the rotary slide sleeve 21 in their central position relative to one another.

The control part 10 carries a drive output member 11 which is arranged as a gearwheel 12, as a steering nut 13 or as a recirculating ball nut 14 and rotates around, and drives, the rack 7. An addition member 8 is fixed to one end of the rack 7 and is additionally fixedly connected to one end 22 of the piston rod 3, so that the electric servo motors 6 drive both the servo valve 2 for the purpose of actuating the servo cylinder 4, and also the rack 7 via the recirculating ball nut 14. In the exemplary embodiments illustrated in FIGS. 1 to 5, the addition member 8 connects the rack 7 and the piston rod 3 to one another at right angles. The rack 7 and the piston rod 3 are arranged parallel to one another and without longitudinal offset, and jointly act on the addition member 8 which fixedly connects the two and is arranged as a yoke 24. The parallel-arrangement of the rack 7 with the servo cylinder 4 results in a short arrangement of the wheel actuator 19 and of the electrohydraulic power steering system.

Figure 2:
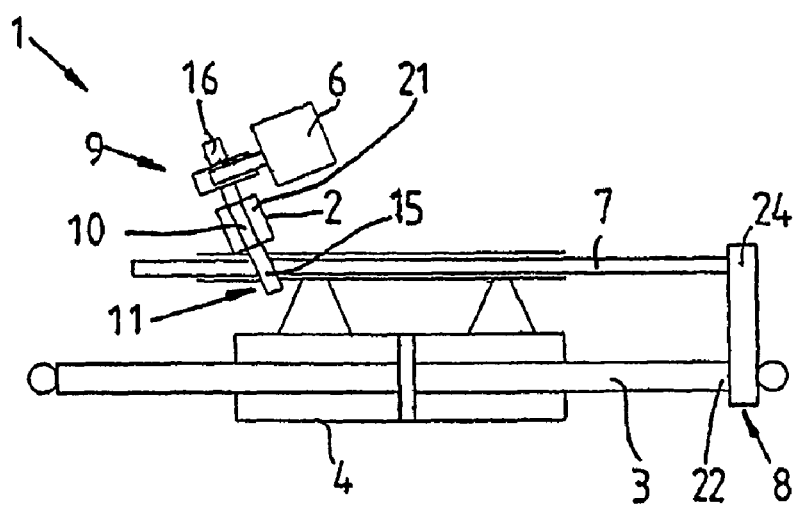
FIG. 2 is a further longitudinal cross-sectional view through an actuator of an electrohydraulic power steering system.
Figure 3:
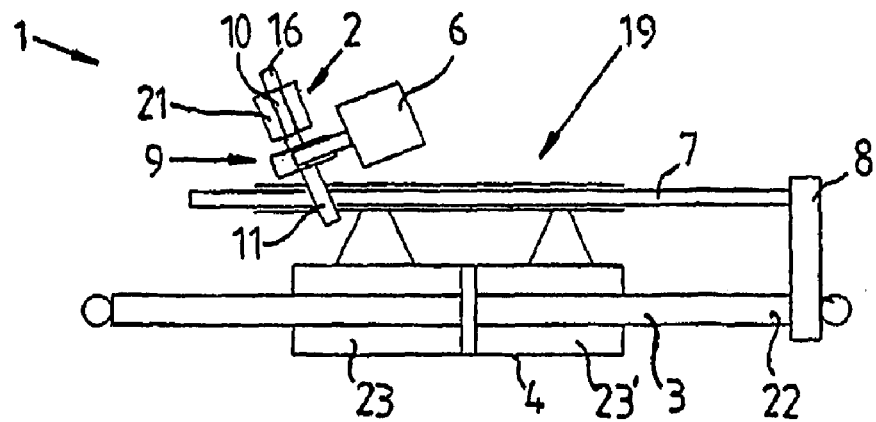
FIG. 3 is a further longitudinal cross-sectional view through an actuator of an electrohydraulic power steering system.

The electrohydraulic power steering systems illustrated in a schematic longitudinal cross-sections in FIGS. 2 and 3 are of identical arrangement with identical coupling of the rack 7 and the piston rod 3 to the addition member 8. The electric servo motor 6 drives the control part 10 via a gearing 9, the control part 10 acting on the rack 7 via a drive output member 11 for the purpose of axially displacing said rack 7 (cf. FIG. 2). A steering shaft 16 is rotationally fixedly connected to the control part 10. In FIG. 3, the steering shaft 16 drives the control part 10 of the servo valve 2 which acts on the rack 7 via a drive output member 11 which is arranged as a pinion 15. A step-up gearing 9 is arranged, with the electric servo motor 6, between the control part 10 and the drive output member 11, the electric servo motor 6 acting on the drive output member 11.

Figure 4:
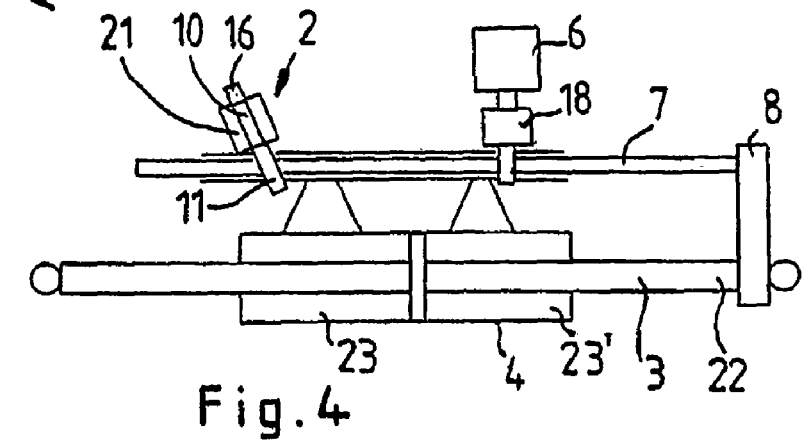
FIG. 4 is a schematic longitudinal cross-sectional view through an electrohydraulic power steering system in the form of a double a pinion steering system.
Figure 5:
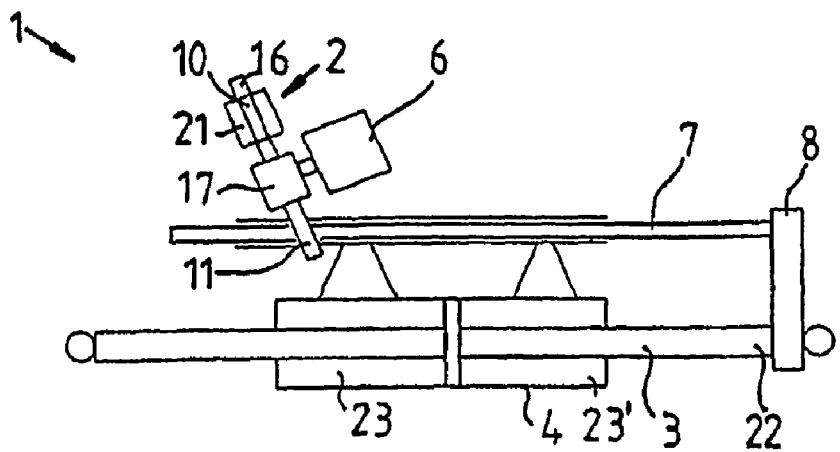
FIG. 5 is a schematic longitudinal cross-sectional view through an electrohydraulic power steering system which is arranged as a superposition steering system.

FIGS. 4 and 5 are schematic longitudinal cross-sectional views through an electrohydraulic power steering system. In FIG. 4, the electric servo motor 6 acts on the rack 7 via a gearing 18, while the servo valve 2 and its control part 10 are rotationally fixedly connected to the steering shaft 16 and act on the rack 7 via the drive output member 11 (double pinion steering system).

In FIG. 5, the electric servo motor 6 acts on the drive output member and the rack via a superposition gearing 17 between the servo valve 2 and the drive output member 11.

LIST OF REFERENCE CHARACTERS

1 Hydraulic power steering system
2 Servo valve
3 Piston rod
4 Servo cylinder
5 Wheel
6 Servo motor, electric
7 Rack
8 Addition member
9 Gearing
10 Control part
11 Drive output member
12 Gearwheel
13 Steering nut
14 Recirculating ball nut
15 Pinion
16 Steering shaft
17 Superposition gearing
18 Gearing
19 Linear wheel actuator
20 Rotary slide
21 Rotary slide sleeve
22 End
23,23' Working space
24 Yoke
β Steering angle

The invention claimed is:

1. A hydraulic power steering system for a vehicle, comprising:
    a servo cylinder including a piston rod;
    a servo valve including control parts, relative movement of the control parts of the servo valve adapted to actuate the piston rod to change at least one steering angle of a wheel operatively connected to the piston rod;
    a rack;
    an electric servo motor adapted to drive the rack with the servo cylinder to adjust the steering angle of the wheel in a same direction;
    a steering shaft adapted to act on a control part of the servo valve; and
    a drive output member, the servo valve adapted to act on the rack via the drive output member;
    wherein the rack and the piston rod are adapted to act in a parallel arrangement with one another on an addition member to jointly adjust the steering angle of the wheel.

2. The hydraulic power steering system according to claim 1, wherein the hydraulic power steering system is arranged as an electrohydraulic power steering system for a motor vehicle.

3. The hydraulic power steering system according to claim 1, wherein the rack and the piston rod are one of (a) fixedly and (b) articulatedly connected to the addition member.

4. The hydraulic power steering system according to claim 1, wherein the electric servo motor is adapted to act on the control part of the servo valve by a gearing.

5. The hydraulic power steering system according to claim 4, wherein the control part is connected to the drive output member.

6. A hydraulic power steering system for a vehicle, comprising:
    a servo cylinder including a piston rod;
    a servo valve including control parts, relative movement of the control parts of the servo valve adapted to actuate the piston rod to change at least one steering angle of a wheel operatively connected to the piston rod;
    a rack;
    an electric servo motor adapted to drive the rack with the servo cylinder to adjust the steering angle of the wheel in a same direction;
    a steering shaft adapted to act on a control part of the servo valve; and
    a drive output member, the servo valve adapted to act on the rack via the drive output member;
    wherein:
        the rack and the piston rod are adapted to act in a parallel arrangement with one another on an addition member to jointly adjust the steering angle of the wheel;
        the electric servo motor is adapted to act on the control part of the servo valve by a gearing;
        the control part is connected to the drive output member; and
        the drive output member includes a gear wheel operatively connected to one of (a) a steering nut and (b) a recirculating ball nut arranged around the rack.

7. A hydraulic power steering system for a vehicle, comprising:
    a servo cylinder including a piston rod;
    a servo valve including control parts, relative movement of the control parts of the servo valve adapted to actuate the piston rod to change at least one steering angle of a wheel operatively connected to the piston rod;
    a rack;

an electric servo motor adapted to drive the rack with the servo cylinder to adjust the steering angle of the wheel in a same direction;
a steering shaft adapted to act on a control part of the servo valve; and
a drive output member, the servo valve adapted to act on the rack via the drive output member;
wherein:
- the rack and the piston rod are adapted to act in a parallel arrangement with one another on an addition member to jointly adjust the steering angle of the wheel;
- the electric servo motor is adapted to act on the control part of the servo valve by a gearing;
- the control part is connected to the drive output member; and
- the drive output member includes a pinion meshing with a toothing of the rack.

8. A hydraulic power steering system for a vehicle, comprising:
a servo cylinder including a piston rod;
a servo valve including control parts, relative movement of the control parts of the servo valve adapted to actuate the piston rod to change at least one steering angle of a wheel operatively connected to the piston rod;
a rack;
an electric servo motor adapted to drive the rack with the servo cylinder to adjust the steering angle of the wheel in a same direction;
a steering shaft adapted to act on a control part of the servo valve; and
a drive output member, the servo valve adapted to act on the rack via the drive output member;
wherein:
- the rack and the piston rod are adapted to act in a parallel arrangement with one another on an addition member to jointly adjust the steering angle of the wheel; and
- the electric servo motor is adapted to act on one of (a) the drive output member by a superposition gearing or (b) the rack by a gearing.

9. The hydraulic power steering system according to claim 1, wherein two electric servo motors are adapted to act at least one of (a) on the rack and (b) on the control part of the servo valve.

10. The hydraulic power steering system according to claim 1, wherein the hydraulic power steering system includes electric servo motors of different power, the hydraulic power steering system adapted to transmit different levels of steering power.

* * * * *